United States Patent [19]
Croucher et al.

[11] Patent Number: 6,023,792
[45] Date of Patent: Feb. 15, 2000

[54] PORTABLE TOILET

[76] Inventors: Rodney K. Croucher, 3207 Rock Creek; Charles F. Adamson, 800 S. Main; Alan Maxwell, 2259 Nebraska Rd., all of Ottawa, Kans. 66067

[21] Appl. No.: 09/119,851
[22] Filed: Jul. 21, 1998
[51] Int. Cl.[7] .................................................. A47K 11/06
[52] U.S. Cl. ........................................ 4/484; 4/460; 4/458
[58] Field of Search ............................... 4/449, 458, 460, 4/483, 484

[56] References Cited

U.S. PATENT DOCUMENTS

| | | |
|---|---|---|
| D. 355,710 | 2/1995 | Hostetler et al. . |
| 2,772,420 | 12/1956 | Carter ....................................... 4/458 X |
| 3,737,920 | 6/1973 | Savee . |
| 3,950,794 | 4/1976 | Dalton . |
| 3,992,727 | 11/1976 | Elkins . |
| 4,823,412 | 4/1989 | Spiegel ........................................ 4/483 |
| 4,962,551 | 10/1990 | Bly ......................................... 4/483 X |
| 5,083,324 | 1/1992 | Strong . |
| 5,088,134 | 2/1992 | Douglas . |
| 5,095,556 | 3/1992 | Franey ........................................ 4/460 |
| 5,230,105 | 7/1993 | Watson . |
| 5,341,517 | 8/1994 | Bly . |
| 5,586,344 | 12/1996 | Liang . |

OTHER PUBLICATIONS

"The Bumper Dumper" http://www.bumper-dumper.com/ Nov. 1998.

*Primary Examiner*—Charles E. Phillips
*Attorney, Agent, or Firm*—Chase & Yakimo, L.C.

[57] ABSTRACT

A portable toilet for attachment to a vehicle trailer hitch comprises a toilet seat pivotally attached to a frame. The toilet includes extendable legs for supporting the front portion of the toilet seat and frame under the weight of a user. The legs are pivotally attached to the frame and thus can be rotated to a position adjacent and parallel to side arms of the frame when not in use or for transport and storage. The camping toilet further includes a waste collection assembly having a waste bag removable attached thereto, the assembly being slidably positioned beneath the toilet seat. A mounting assembly includes a bar which secures the toilet within a selected pair of the plurality of inclined slots presented by a mounting bracket. Accordingly, the height of the toilet above the ground is regulated. The mounting bracket is fixedly attached to a draw bar for mounting the overall camping toilet to a box hitch or ball hitch of a vehicle. Alternatively, the camping toilet can include a pair of hook-like support arms for hanging the toilet upon a tire of a vehicle.

20 Claims, 8 Drawing Sheets

6,023,792

1

PORTABLE TOILET

BACKGROUND OF THE INVENTION

This invention relates to a portable toilet and, more particularly, to a portable toilet for camping or travelling which attaches to the trailer hitch of a vehicle.

A well known difficulty experienced by travelers or individuals camping in a wilderness environment is finding suitable toilet facilities. Several devices have been proposed in the prior art which provide a portable toilet for use while camping or traveling.

Although assumably effective in operation, such known devices are complex in construction or assembly and are not adapted for attachment to a vehicle. Thus, it is desirable to have a portable toilet which may be quickly and conveniently attached to a vehicle for use by a traveler or camper.

SUMMARY OF THE INVENTION

In response thereto, we have invented a camping toilet which utilizes a frame having a pair of parallel side arms with a crossbar extending therebetween to which a toilet seat is pivotally attached. A pair of legs are pivotally mounted to the side arms of the frame, each leg having a lower sleeve slidable within an upper sleeve secured at the desired length by a pin. Further, the legs can be rotated to a position adjacent and parallel to the side arms when not in use or for transport and storage. A waste collection assembly having a waste bag is removably secured within the channels formed within the interior surfaces of the side arms. The waste collection assembly is thereby positioned below the toilet seat during use.

The camping toilet is adjustably mounted to a bracket having a plurality of inclined slots. A bar or male portion of the mounting assembly is fixedly attached to the frame's crossbar and is slidably received by a selected pair of slots in the bracket or female portion for regulating the height of the toilet above the ground. The mounting assembly further includes a plate which bears against the bracket when the bar is completely inserted into a pair of slots to prevent movement of the frame and toilet seat during use.

The mounting bracket may be attached to a draw bar which is adapted to be slidably received within a standard box hitch already mounted to the frame or bumper of a vehicle. If a box hitch is not available, the camping toilet can include a truncated trailer coupler for receiving the draw bar. The coupler can then be attached to the ball hitch of the vehicle. Alternatively, the camping toilet can be hung from a tire of a vehicle with hook-like support arms. The support arms are fixedly attached to the mounting bracket for adjustably supporting the camping toilet.

It is therefore a general object of this invention to provide a camping toilet which can be quickly and easily attached to the trailer hitch or tire of a vehicle.

Another object of this invention is to provide a camping toilet, as aforesaid, which, when not in use, can be quickly detached from the trailer hitch and easily stored for transport.

Still another object of this invention is to provide a camping toilet, as aforesaid, which requires no assembly of parts for use.

Yet another object of this invention is to provide a camping toilet, as aforesaid, having legs which can optionally be extended to provide additional support to the front of the toilet seat.

A further object of this invention is to provide a camping toilet, as aforesaid, the legs being pivotally stored beneath the seat when not in use.

2

A still further object of this invention is to provide a camping toilet, as aforesaid, which can be adjusted to a desired height above the ground.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 1:
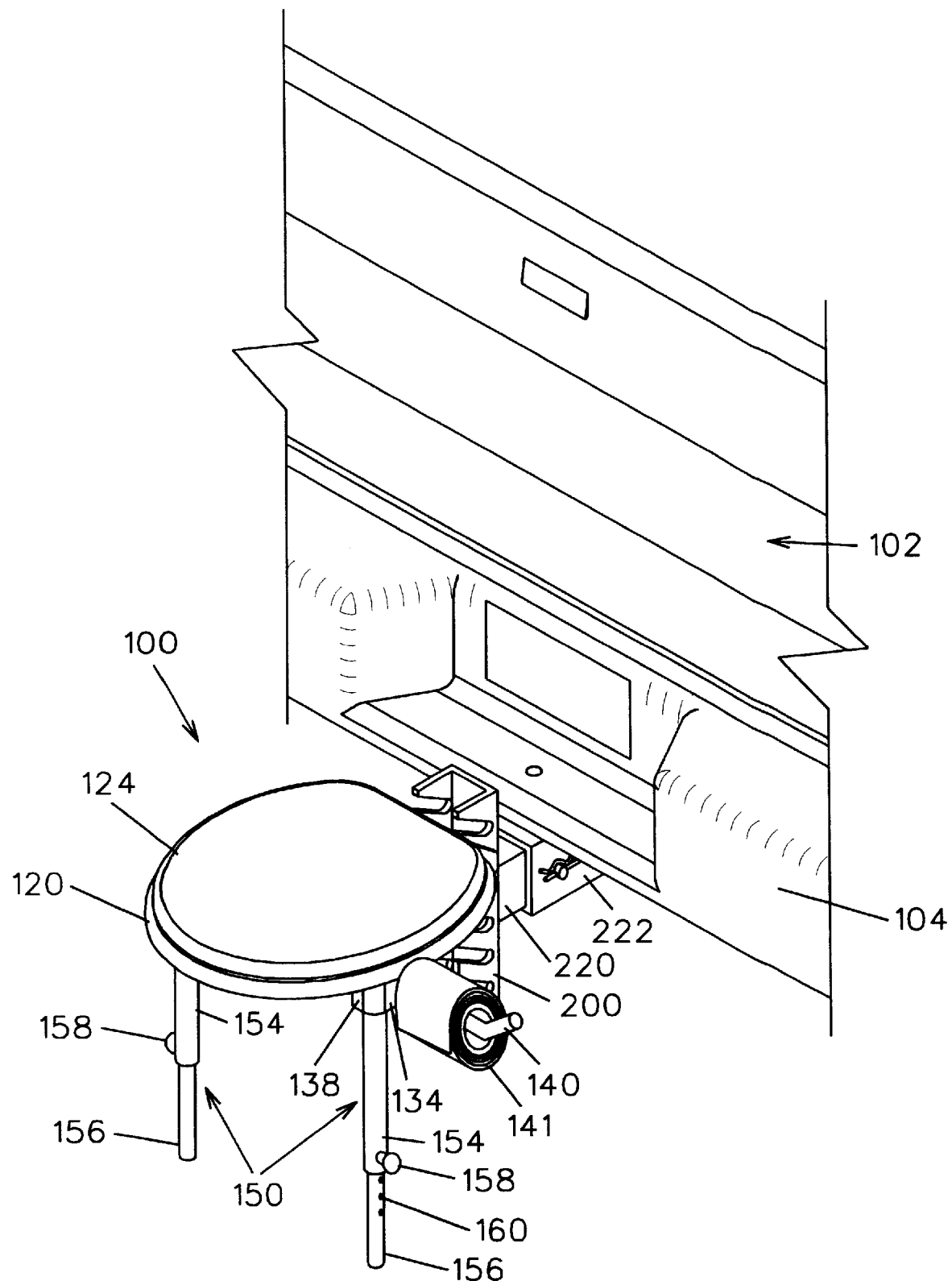
FIG. 1 is a perspective view of the preferred embodiment of the camping toilet attached to the trailer hitch of a vehicle, the camping toilet being shown with the waste collection assembly removed.
Figure 2:
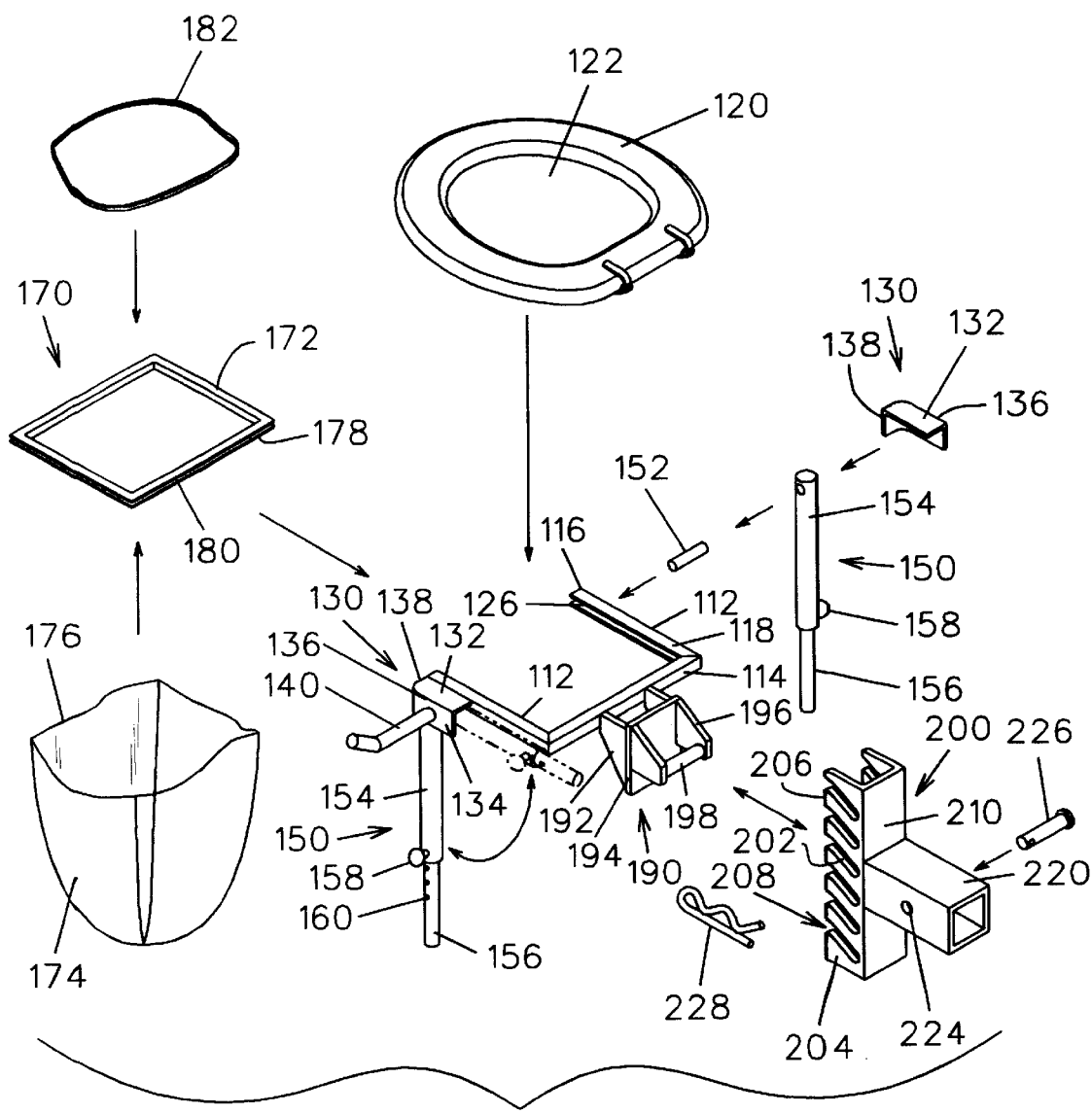
FIG. 2 is an exploded view of the camping toilet of FIG. 1 with the lid removed and showing the waste collection assembly.
Figure 3:
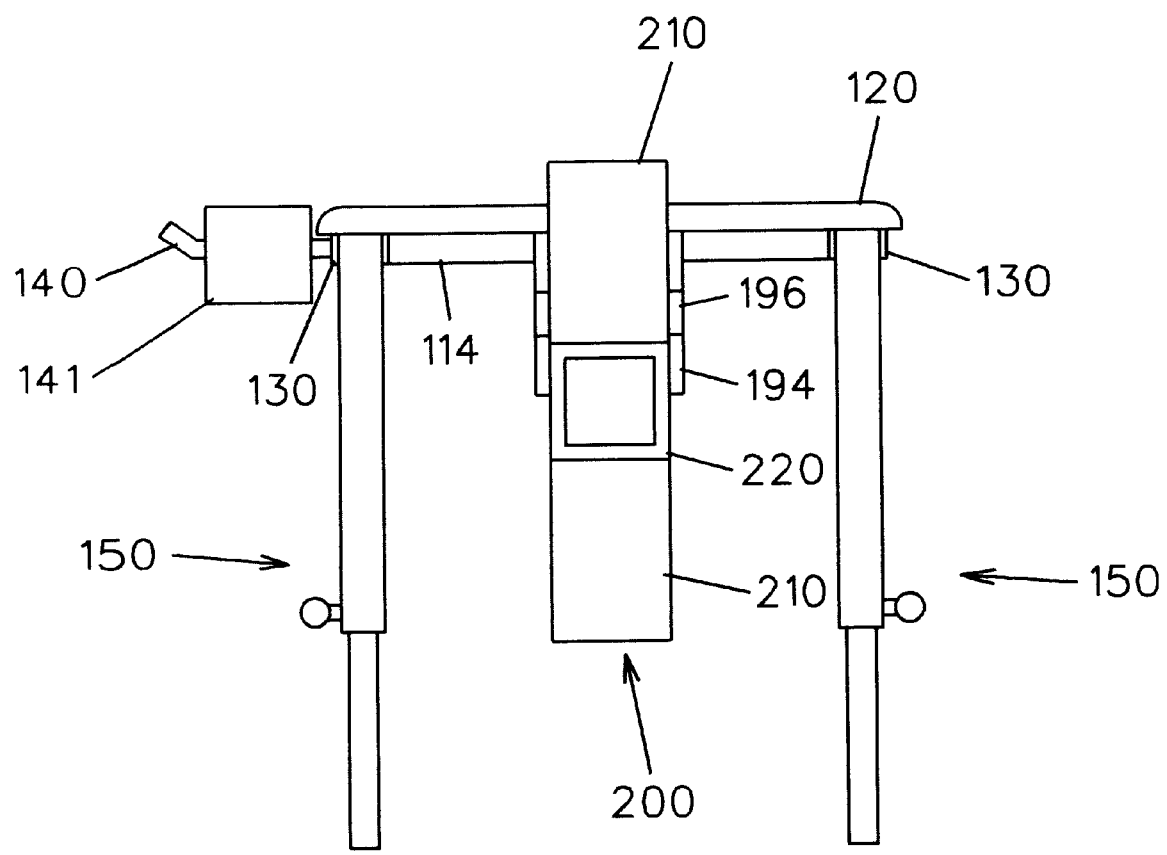
FIG. 3 is a rear view of the camping toilet of FIG. 1 with the vehicle and trailer hitch removed.
Figure 4:
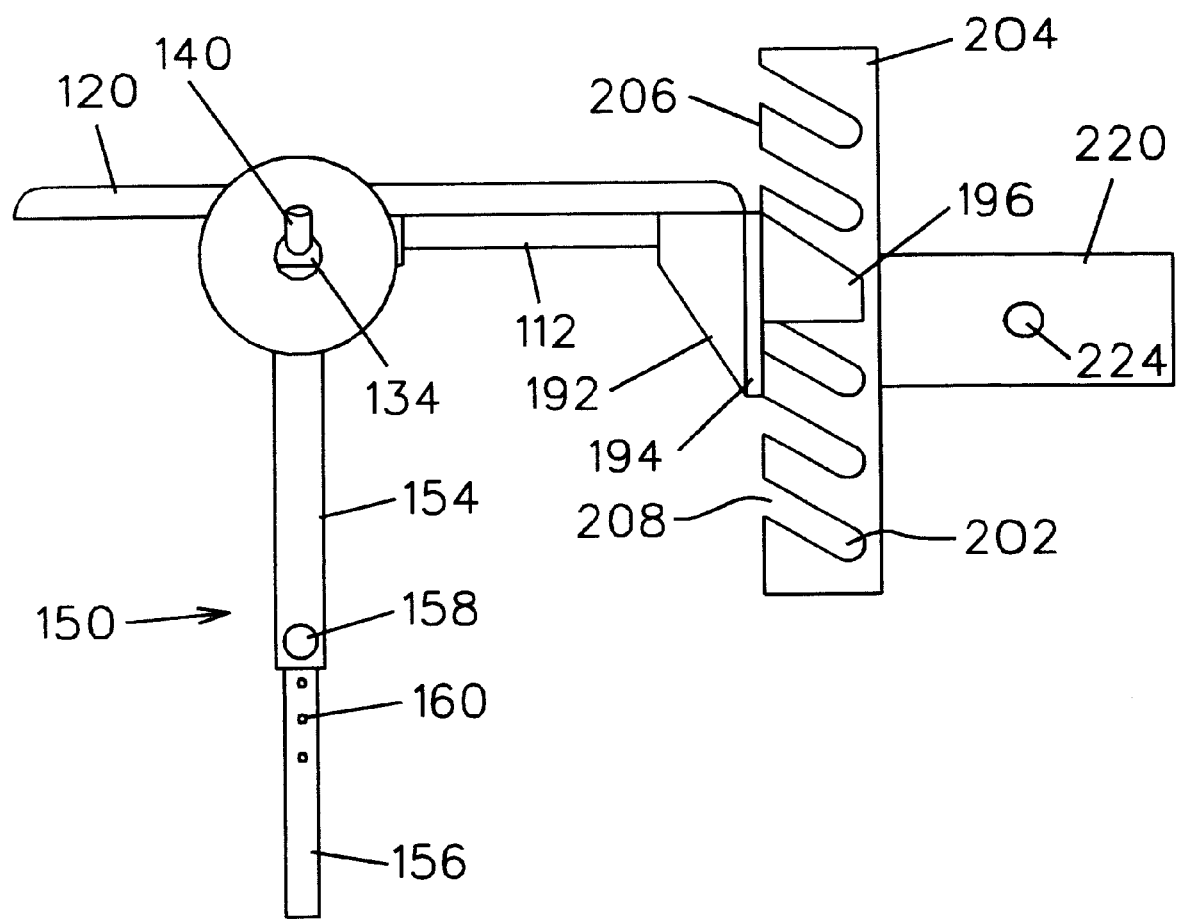
FIG. 4 is a right side view of the camping toilet of FIG. 3.

Turning more particularly to the drawings, FIGS. 1–4 show a first preferred embodiment of the camping toilet 100 attached to a vehicle 102. As seen in FIGS. 2–4, the camping toilet 100 generally comprises a substantially U-shaped frame 110 having parallel side arms 112 with a crossbar 114 extending between proximal ends 118 thereof relative to the vehicle 102. A conventional toilet seat 120 is pivotally attached to the crossbar 114 and bears against the top surface of the side arms 112 when in its down position. A toilet seat lid 124 may also be pivotally attached to the crossbar 114 for covering the opening 122 of the seat 120.

As seen in FIGS. 2 and 3, a cover plate 130 is fixedly attached to each side arm 112 adjacent the free, proximal end 116 thereof for preventing user contact with legs 150 pivotally mounted therebelow. Cover plates 130 has an L-shaped cross-section and comprise an outwardly extending top surface 132 fixedly and securely attached to a side arm 112 of the frame 110 with downwardly extending surface 134 and front surfaces normal to outer edges 136 and 140, respectively, of the top surface 132. One cover plate 130 has an outwardly extending bar 140 adapted for holding a roll of toilet paper 141 thereon extending therefrom.

A pair of legs 150 are pivotally mounted to outer edges of side arms 112 adjacent proximal ends 116 thereof, the legs 150 being rotatable about a pivot axis formed by a pin 152 extending therethrough for movement between a transport position and a use position. Each leg 150 further comprises an upper sleeve 154 with a lower sleeve 156 slidable therein. A pin 158 extends through an aperture in each upper sleeve 154 and snap-fits into a selected aperture 160 in the corresponding lower sleeve 156. The pins 158 thereby maintain the legs 150 at the desired length.

More specifically, each lower sleeve 156 includes a plurality of spaced apart apertures 160 therethrough such that the height of each leg 150 can be regulated upon each pin 158 being inserted by a user. Adjustment of the height of a leg 150 for use of the toilet 100 is accomplished by a user retracting the pins 158 out of the previously selected apertures 160 and then slidably adjusting the lower sleeves 154, 156, until the pins 158 snap-fit into the next adjacent aperture 160 in the corresponding lower sleeve 156. Accordingly, the lower sleeves 156 can be securely positioned substantially within the corresponding upper sleeve 154 such that the legs 150 are short enough to be rearwardly rotated to a transport position adjacent and parallel to the corresponding side arm 112 of the frame 110 for storage or transport. It is understood that adjustment of the legs 150 could also be accomplished with a rack and pinion gear system or pneumatic height control cylinder.

As seen in FIG. 2, the side arms 112 of the frame 110 present inwardly disposed channels 126 for slidably receiving a waste collection assembly 170 therein (FIG. 2). The waste collection assembly 170 comprises a generally square shaped rim 172 which is slidably receivable into the channels 126 to a position beneath the toilet seat 120. A waste bag 174 is attached to the rim 172 by first placing the bag 174 within the interior space defined by the rim 172 and then stretching the edges 176 of the open end of the bag over the top of the rim 174 and about the exterior surfaces 178 thereof. A channel 180 is presented in the exterior surfaces 178 of the rim 172 such that an elastic member 182, such as a rubber band, can securely hold the bag 174 therein. When the bag 174 becomes loaded with waste, a user can simply remove the bag 174 and replace it with a new one.

It is understood that waste containers other than a bag could be utilized with the present invention. For example, a bowl could be integrally attached to the underside of the rim for placement beneath the toilet seat 120.

A mounting assembly 190 is fixedly and securely attached to the crossbar 114 of the frame 110 for mounting the toilet 100 to a vehicle and selectively regulating the height of the frame 110 above the ground. The mounting assembly 190 includes a first pair of laterally spaced apart rearwardly extending flanges 192 fixedly attached to the frame's crossbar 114, the flanges 192 preferably being in the form of gussets. A first surface of a plate 194 is attached across rear ends of the flanges 192 while the opposed surface of the plate 194 is integrally attached to a second pair of laterally spaced apart flanges 196. A portion of the plate 194 extends below the second pair of flanges 196. A bar 198 extends between the ends of the second pair of flanges 196 and is fixedly attached to the inner surfaces thereof.

The mounting assembly 190 further includes a mounting bracket 200, as seen in FIGS. 1–4, presenting a plurality of inclined slots 202 formed in parallel side walls 204 thereof. The bar 198 traversing the second pair of flanges 196 is slidably received and secured within a selected pair of slots 202 in the mounting bracket 200, each slot presenting an opening 208 in a front edge 206 of the corresponding side wall 204 of the bracket 200.

A user can adjust the height of the camping toilet 100 by first pulling the entire toilet upwardly and outwardly from the mounting bracket 200 until the bar 198 is released from a previously selected pair of slots 202. The user can then slide the bar 198 into the desired pair of slots 202 until the bar reaches the lower ends of the slots 202. The portion of the plate 194 which extends below the flanges 196 bears against front edges 206 of the side walls 204 of the bracket 200 to support the weight of the toilet 100 during use.

Figure 5:
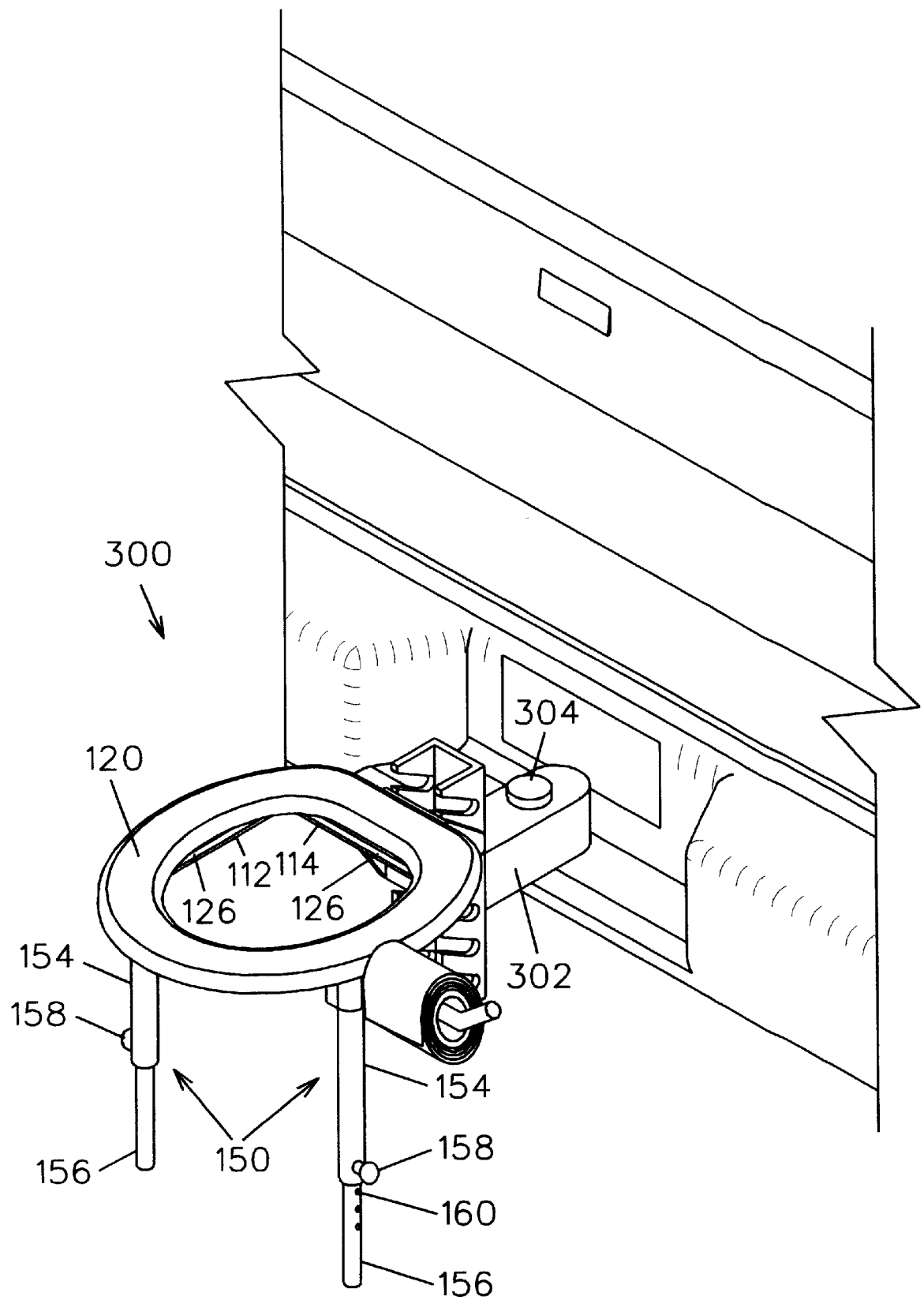
FIG. 5 is a perspective view of a second embodiment of the camping toilet with the lid removed, attached to a ball hitch of a vehicle.

A draw bar 220 is fixedly and securely attached to a rear wall 210 of the mounting bracket 200 approximately midway between top and bottom ends thereof. In mounting the camping toilet to the rear of a vehicle 102, the draw bar 220 is slidably received within a conventional box hitch 222 previously mounted to the frame or bumper 104 of the vehicle 102, as seen in FIG. 1, the box hitch being known in the art. The draw bar 220 presents apertures 224 in opposed sides thereof which align with apertures in the box hitch 222. Thus, the camping toilet 100 is secured to the vehicle by inserting a bolt 226 through the apertures in the draw bar 220 and box hitch 222 and securing the bolt therein with a pin 228.

Where a box hitch 222 has not been previously fixedly attached to the frame or bumper of the vehicle, a second embodiment 300 of the camping toilet further includes a truncated trailer coupler 302 of the type known in the art. See FIG. 5. The coupler 302 presents a chamber with an opening in the underside thereof (not shown) for engaging the ball hitch of the vehicle. The coupler 302 further includes a twistable knob tightening mechanism 304 that is also known. The draw bar 220 is slidably mounted within the coupler.

Figure 6:
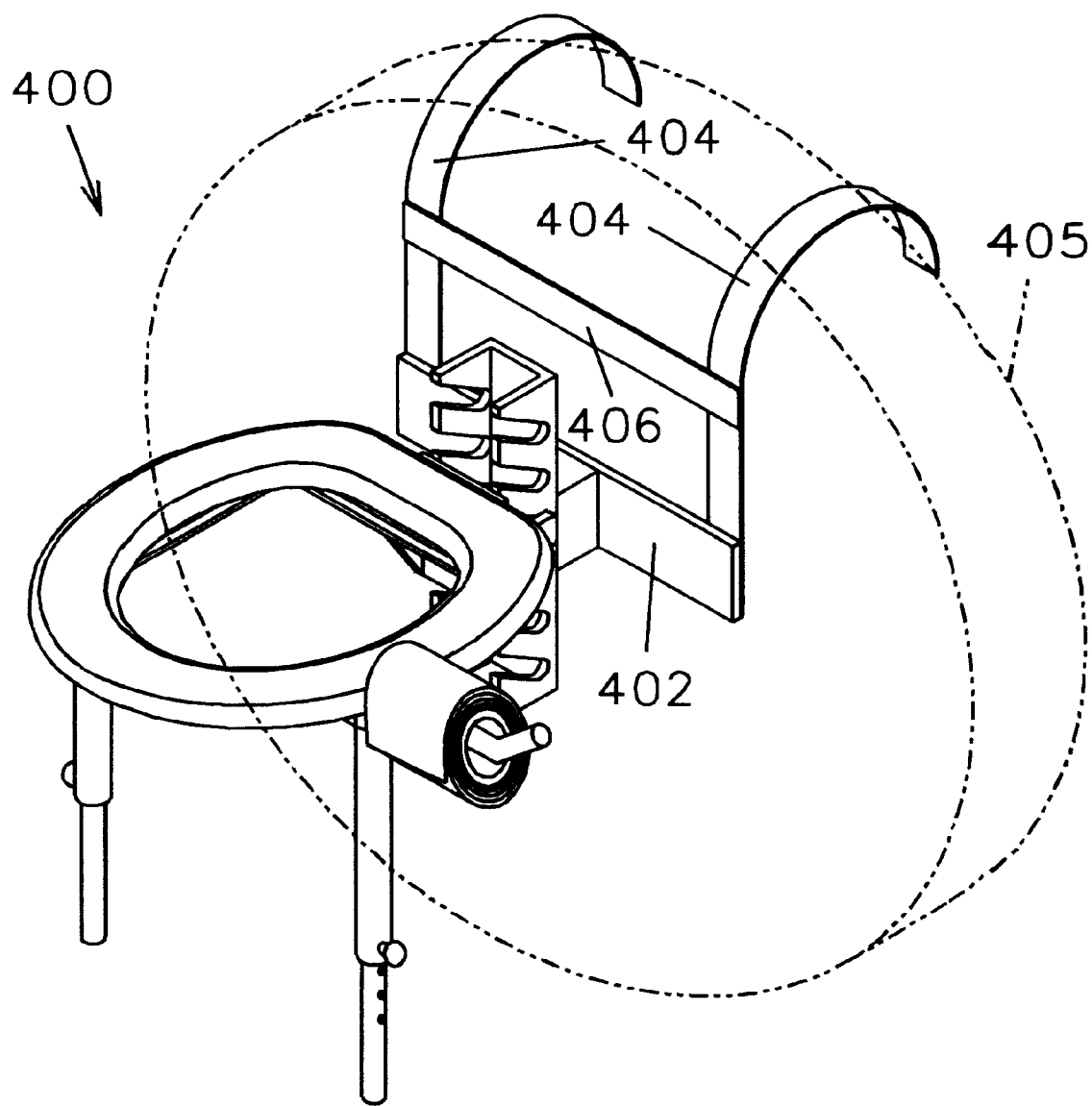
FIG. 6 is a perspective view of a third embodiment of the camping toilet with the lid removed and attached to a tire of a vehicle with a rear mounted spare tire being shown with phantom lines.
Figure 7:
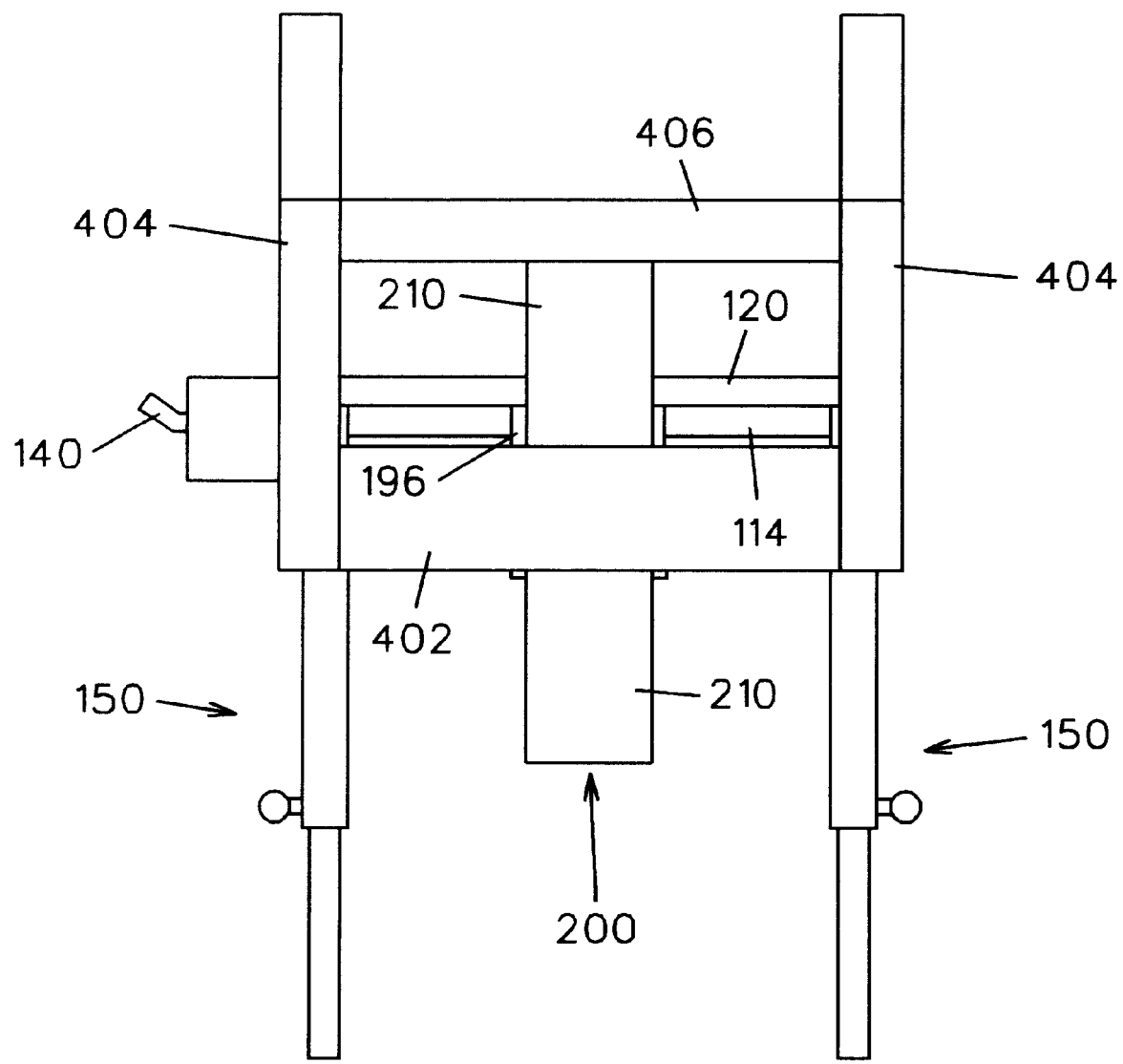
FIG. 7 is a rear view of the camping toilet of FIG. 6.
Figure 8:
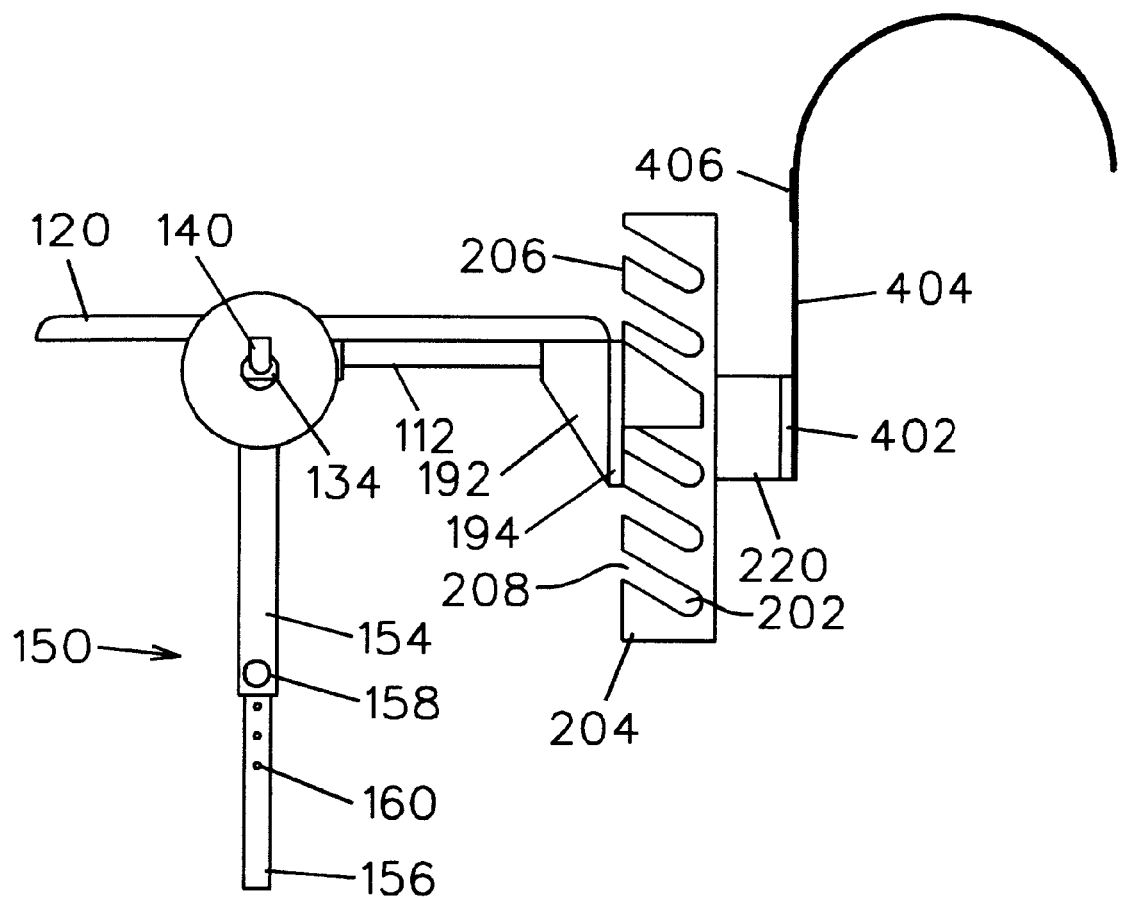
FIG. 8 is a right side view of the camping toilet of FIG. 6.

As shown in FIGS. 6–8, a third embodiment 400 of the camping toilet is very similar to the first embodiment previously described except as discussed below. An elongated plate 402 is fixedly attached to the end of the draw bar 220, with the plate 402 extending perpendicularly outwardly from both sides of the draw bar 220. A pair of upwardly extending hook-shaped support members 404 are fixedly attached to opposed ends of the elongated plate 402 for hanging the camping toilet from the top of a tire. A crossbar 406 extends between the support members 404 and bears against the tire 405 when the camping toilet 100 is in use. Thus, this embodiment of the camping toilet is useful by travelers or campers having a car or truck without a hitch.

Accordingly, it can be seen that the camping toilet 100 can be quickly and easily attached to or removed from various types of vehicles. Specifically, the camping toilet 100 provides a convenient sanitary toilet facility for campers and travelers.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A portable toilet comprising:
   a frame;
   a toilet seat pivotally attached to said frame;
   a waste reservoir secured to said frame;
   a mounting assembly for securing said frame to a vehicle at user-selectable heights relative thereto;
   said mounting assembly including a male portion on said frame adapted to be engaged within a female bracket portion;
   said female bracket portion adapted to be secured to the vehicle.

2. A portable toilet as claimed in claim 1 further comprising:
   a draw bar extending outwardly from said female bracket portion adapted to be received within a box hitch mounted to the vehicle.

3. A portable toilet as claimed in claim 1 further comprising:
   a trailer coupler extending outwardly from said female bracket portion, adapted to engage a ball hitch mounted to the vehicle.

4. A portable toilet as claimed in claim 1 further comprising:
   a hook member extending upwardly from said female bracket portion adapted to hang said toilet frame from a tire of the vehicle.

5. A portable toilet as claimed in claim 1 wherein said female bracket portion comprises a plurality of spaced apart slots formed in opposed side walls thereof, said slots being adapted to selectively receive said male portion therein.

6. A portable toilet as claimed in claim 1 further comprising:
   a pair of legs pivotally coupled to said frame for movement between a storage position substantially adjacent said frame and a use position with said legs extending from said frame for engagement with a ground surface.

7. A portable toilet as claimed in claim 6 further comprising means for regulating a length of said legs.

8. A portable toilet as claimed in claim 1 further comprising means for releasably engaging said waste reservoir to said frame.

9. A portable toilet as claimed in claim 8 wherein said reservoir engaging means comprises:
   a channel in said frame;
   means for releasably securing a portion of said reservoir to said channel in a manner to place an inlet of said reservoir below said seat.

10. A portable toilet as claimed in claim 9 wherein said releasable securing means comprises:
    a second rim presenting an opening, said second rim engageable with said channel;
    a fastener for surrounding said second rim with said portion of said reservoir therebetween.

11. A portable toilet comprising:
    a first frame having a channel formed therein;
    a toilet seat pivotally attached to said frame;
    a waste collection reservoir presenting a rim portion about an inlet opening;
    means for mounting said first frame to a vehicle at selectable heights relative thereto;
    means for releasably engaging said rim to said channel whereby to mount said reservoir to said frame.

12. A portable toilet as claimed in claim 11 wherein said releasable engagement means comprises:
    a second frame engageable with said channel;
    an elastic member extending around said second frame with said rim portion therebetween, whereby engagement of said second frame with said channel positions said inlet opening about said channel.

13. A portable toilet as claimed in claim 11 wherein said first frame's channel is formed in an inner surface thereof.

14. A portable toilet as claimed in claim 11 wherein said mounting means includes a male portion fixedly secured to said first frame and adapted to be selectively secured within a female portion, said female portion adapted to be secured to the vehicle.

15. A portable toilet as claimed in claim 14 wherein said male portion includes a plate which bears against said female portion to prevent movement of said toilet when in use.

16. A portable toilet comprising:
    a frame having a channel formed in an inner surface thereof;
    a toilet seat pivotally attached to said frame;
    a waste collection assembly removably mounted to said frame's channel;
    a mounting assembly for securing said toilet to a vehicle and selectively regulating the height of said frame;
    said mounting assembly including a male fastener fixedly secured to said frame and adapted to be secured within a female fastener, said female fastener adapted to be secured to the vehicle;
    said waste collection assembly including a rim for reception within said frame channel, a waste bag and an elastic member for securing said bag to said rim;
    said rim having a channel formed around an outer perimeter thereof and said elastic member securing said bag within said rim's channel.

17. A portable toilet as claimed in claim 16 further comprising:
    a draw bar extending outwardly from said female fastener and adapted to engage a box hitch mounted to the vehicle.

18. A portable toilet as claimed in claim 16 further comprising:
    a trailer coupler extending outwardly from said female fastener and adapted to engage a ball hitch mounted to the vehicle.

19. A portable toilet as claimed in claim 16 further comprising:
    a hook member extending upwardly from said female fastener and adapted to hang from a tire of the vehicle.

20. A portable toilet as claimed in claim 16 further comprising:
    a pair of legs pivotally coupled to said frame for movement between a storage position substantially adjacent said frame and a use position with said legs extending downwardly and outwardly from said frame for engagement with a ground surface.

* * * * *